M. BUCHMÜLLER.
CANDY MAKING MACHINE.
APPLICATION FILED OCT. 23, 1909.
1,119,062.
Patented Dec. 1, 1914.
4 SHEETS—SHEET 3.
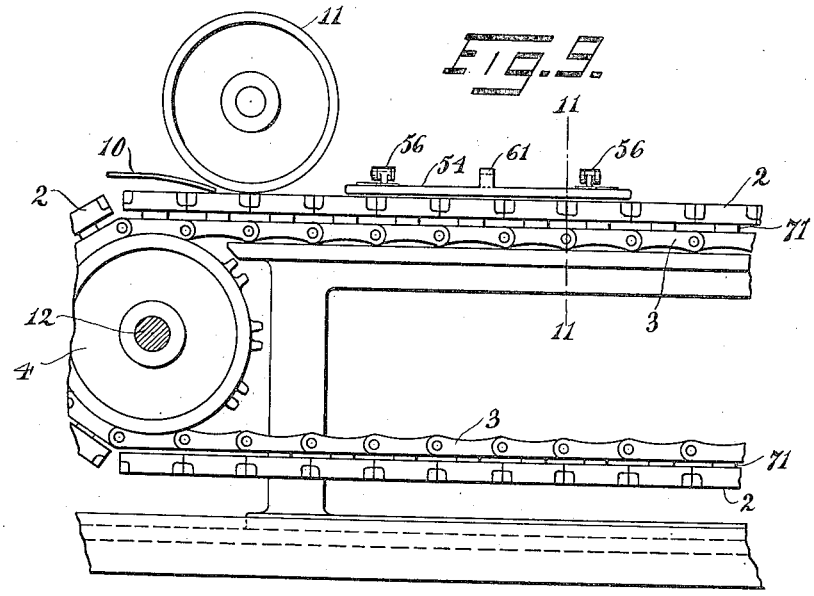
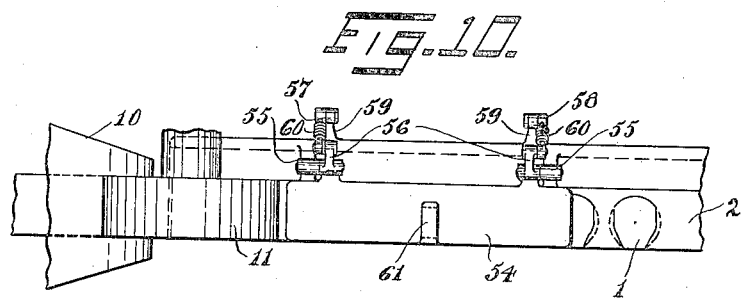
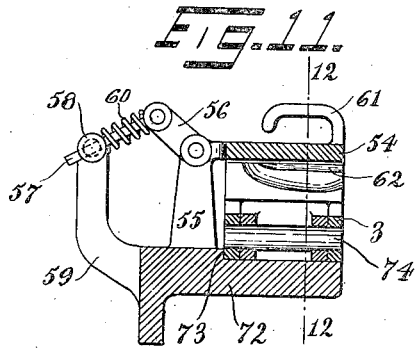
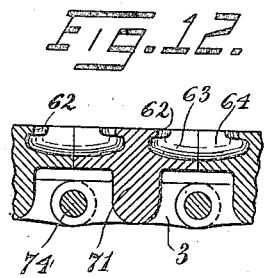
Witnesses:
L. O. Badeau.
H. D. Penny
Inventor:
Max Buchmüller,
By his Attorney, F. H. Richards

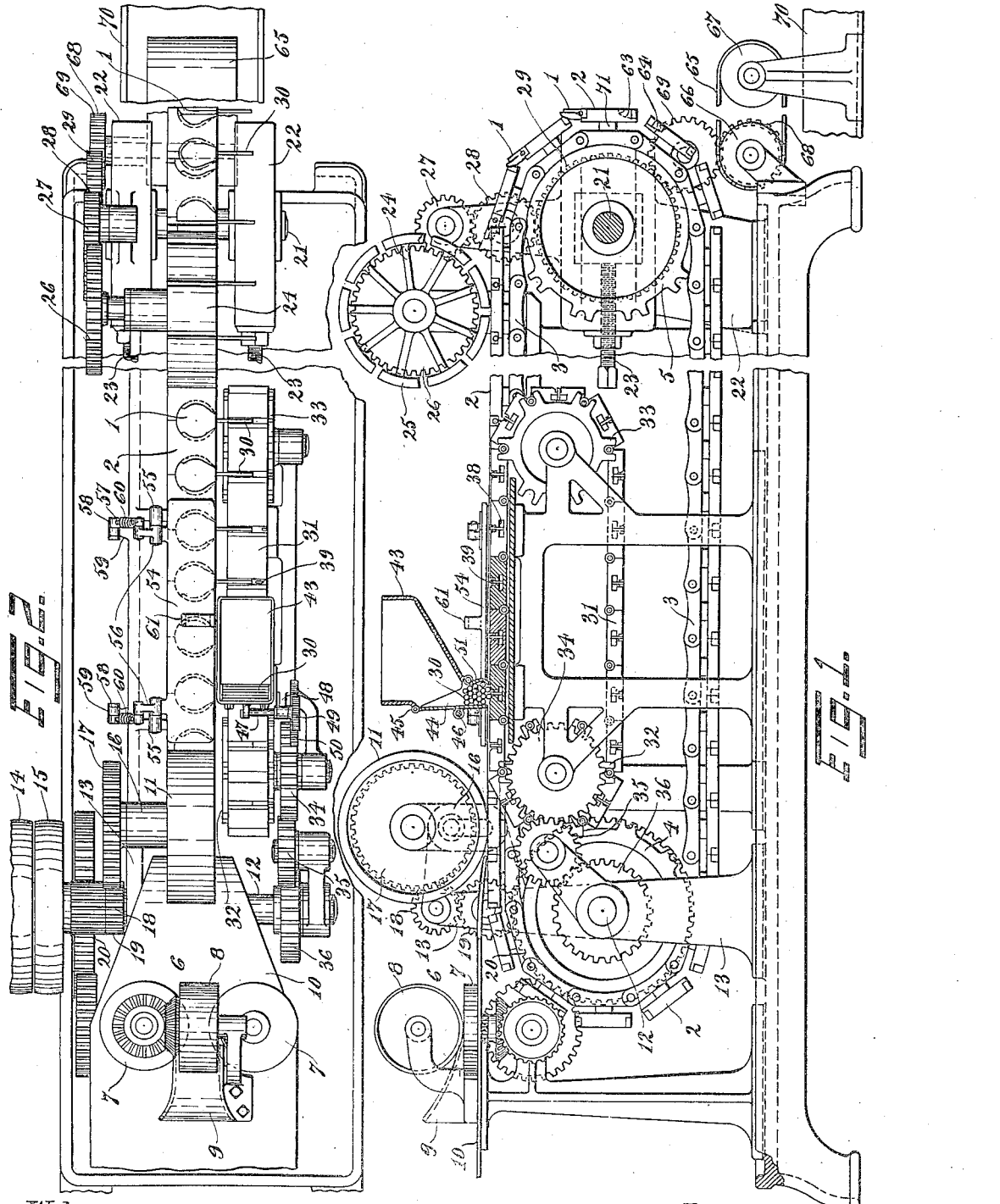

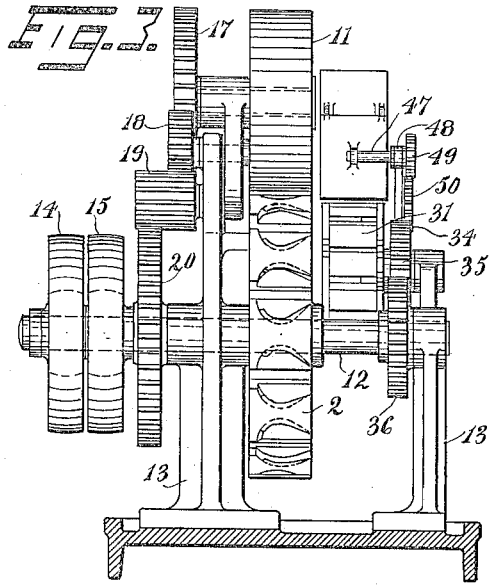

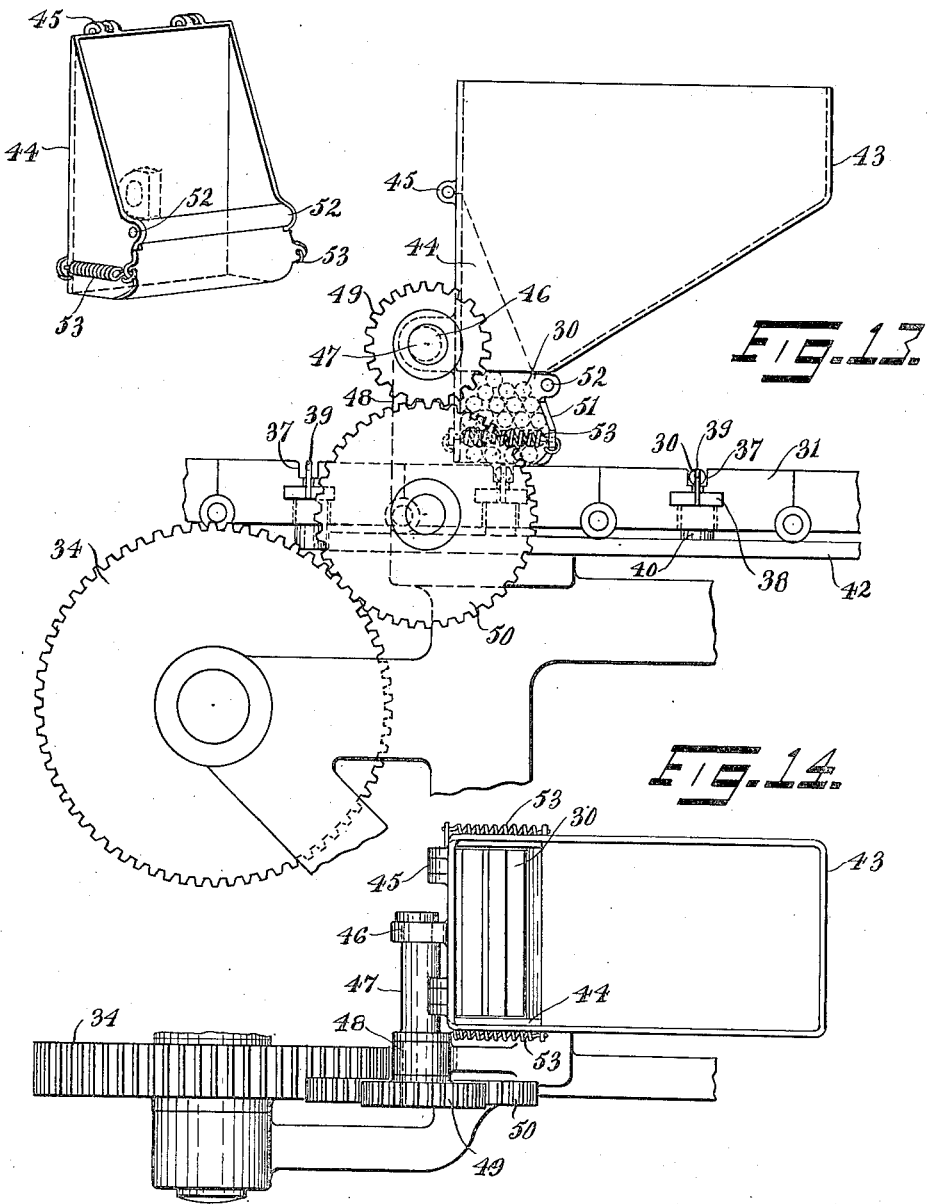

UNITED STATES PATENT OFFICE.

MAX BUCHMÜLLER, OF NEW HAVEN, CONNECTICUT, ASSIGNOR TO THE BRADLEY, SMITH COMPANY, OF NEW HAVEN, CONNECTICUT, A CORPORATION OF CONNECTICUT.

CANDY-MAKING MACHINE.

1,119,062.      Specification of Letters Patent.      Patented Dec. 1, 1914.

Application filed October 23, 1909. Serial No. 524,158.

*To all whom it may concern:*

Be it known that I, MAX BUCHMÜLLER, a citizen of the United States, residing in New Haven, in the county of New Haven and State of Connecticut, have invented certain new and useful Improvements in Candy-Making Machines, of which the following is a specification.

This invention is in the candy making art, and has for its object to provide improvements in the manufacture of lolly pops, to the forming and molding of the candy, and to the inserting of the sticks into the formed or molded candy while this is held in position in a conveyer.

Mechanism embodying the present improvements will comprise candy forming or molding mechanism and a device for inserting the sticks into the molded candy together with various coöperative and subsidiary devices.

The series of candy molds will preferably be mounted on a carrier in the form of an endless chain. In the machine illustrated herein each of the series of candy molds is divided between two adjacent links of the endless mold chain. The sticks are distributed by an endless chain, into the carrying seats of which chain they will drop from their receptacle. While the sticks are carried by such seats they will be forced into the molded candy.

In the drawings accompanying and forming a part of this specification Figure 1 is a side elevation of a practicable embodiment of a form of my invention. Fig. 2 is a top plan view of the machine as illustrated in Fig. 1. Fig. 3 is an end view of the machine looking from the left toward the right in Fig. 1, the feeding portion being removed in this view. Fig. 4 is an end view similar to Fig. 3 but showing the feeding portion. Fig. 5 is an enlarged plan view in detail illustrating the stick carrying chain, the candy carrying chain, and the stick actuating device. Fig. 6 is a plan view of the cam plate for the stick actuator. Fig. 7 is a perspective of a portion of the stick carrying chain. Fig. 8 is a perspective view of one of the stick pushers detached. Fig. 9 is an enlarged view of the candy carrying and mold chain, illustrating the position of a retaining device for running over the candy carriers during the stick inserting operation. Fig. 10 is a top plan view of the portion of the mechanism illustrated in Fig. 9. Fig. 11 is a cross section of Fig. 10 taken on a plane at about the line 11—11. Fig. 12 is a longitudinal section through two molds of the chain and is taken on a plane at about the line 12—12 of Fig. 11. Fig. 13 is a side view of a portion of the stick carrying portion of the stick supplying mechanism. Fig. 14 is a top plan view of the devices illustrated in Fig. 13; and Fig. 15 is a perspective view of the delivery end of the stick hopper detached from the body of the hopper.

The form of machine herein illustrated embodies a candy conveyer having a series of continuously moving molds, into each of which molds in turn a sufficient quantity of the candy will be placed and molded into form. After the molding the end of a stick will be caused to enter the cavity carrying the molded mass and be pressed into such molded candy therein. The cavities or molds, designated by 1, are each shown formed part upon one mold member 2 and part on the adjacent mold member 2. The series of chain or mold members 2 are mounted on a carrier in the form of an endless sprocket chain 3 of considerable length. When the mold members are at the position between the sprocket wheels 4 and 5, which carry the mold chain, the halves of the mold are closed together and a mold cavity is presented with an open top to which the candy will be fed by a feeding device, designated in a general way by 6. The feed illustrated embodies a set of two horizontal rolls 7—7 and an upright roll 8, all geared together to have the same surface speed. A guide 9 is employed for guiding the candy to the pass between the feed rolls. The rolled candy is delivered from the pass of the feed rolls over the table 10 and onto the mold members 2. The mold members at this position in their path of travel present a plain unbroken surface with the exception of the die cavities. The candy fed onto the mold members is pressed into the mold cavities and off the top surfaces of the mold members, there being provided for this purpose a molding or pressing roller 11, which has the same surface speed and direction of movement as the chain of mold members.

The sprocket wheel 4 is mounted fast upon the driving shaft 12 which is mounted in suitable standards 13 of the machine frame. The shaft is provided with a pair of fast and loose pulleys 14—15 for its actuation. The shaft of the presser roll 11 is mounted in a suitable bearing 16, which shaft is connected by means of a train of gearing with the driving shaft, there being illustrated in the train gear wheels 17, 18, 19 and 20, the latter of which is fast upon the driving shaft. The feed rolls are also connected by a suitable train of gearing with this latter gear wheel. The shaft 21 of the sprocket wheel 5 is mounted in an adjustable bearing member 22 and is controlled by means of a set screw 23 for the purpose of adjusting tension or slack in the sprocket chain 3.

The pressing or molding roller 11 is located above the chain 3 not far from the sprocket wheel 4. Over the chain near the sprocket wheel 5 is mounted an auxiliary or finishing pressing roller 24. This roller 24 is provided with an interrupted working face and presents a number of smoothing members 25. The auxiliary presser roll is driven by means of gear wheels 26, 27, 28 and 29 from the shaft 21 of the sprocket wheel 5, the gearing being so timed that the surface speed of these members 25 will be equal to the surface speed of the mold members.

After the candy has been molded, the sticks 30 will be inserted in the candy. A stick carrying device is illustrated, in the form of an endless chain 31. The chain runs over the sprocket wheels 32 and 33 which are suitably mounted in standards of the machine frame. The sprocket wheel 32 has fast with it a gear wheel 34, which, by means of a train of gears 35—36, will be driven from the driving shaft 12. Each of the links of the stick chain 31 is provided with a stick seat 37 of substantially the length of the width of the link and of such dimensions that it will conveniently accommodate a stick. The upper run of this stick chain is shown placed adjacent to the path of movement of the candy carriers between the pressing or molding roller 11 and the finishing roller 24. The gearing is such that the sticks and the candy will have coincidence of speed as well as coincidence of direction. Each link of the stick chain is provided with a stick pusher, a form of which is illustrated in perspective in Fig. 8 and comprises a slide member 38 which is received by suitable guideways in a link and is provided with a stick engaging member 39 adapted to traverse the stick seat. The traverse of the stick pusher is effected by means of an engaging member 40 carried by the slide 38. The engaging member for each pusher will, when the link carrying the same approaches the stick inserting zone, run into the cam slot 41 of a cam plate 42 and force the end of the stick in the stick seat into the cavity of the candy carrier and into the molded candy therein.

The stick inserting mechanism is located at such a position relative to the molding devices that the operation of inserting the sticks into the candy will not interfere with the molding operation. Before each link of the stick chain reaches the active portion of the cam groove 41 it will be provided with a stick. A supply of the sticks is shown in a hopper 43 which is located above the path of movement of the upper run of the stick chain, just in advance of the stick inserting zone. The lower portion of the hopper is provided with a movable mouth or delivery end 44 which is pivoted at 45 to the main hopper and has its opening located in position just above the upper surface of the chain, so that the sticks in this delivery portion of the hopper will rest upon the chain as it moves under the hopper. For preventing the sticks becoming clogged in the hopper the delivery portion will be given a reciprocatory or vibratory motion parallel with the stick chain movement. For this purpose an eccentric 46 is mounted upon a shaft 47 having a bearing in a standard 48. The shaft 47 is rotated by means of a train of gearing 49 and 50, which latter gear wheel meshes with the gear wheel 34. In some instances it may be desirable to move the lower portion of the hopper forward in coincidence with the chain for a short distance and then rapidly draw it backward in a counter direction to the travel of the chain. Sometimes it may happen that a broken or bent stick or one which is carrying some foreign substance may not be properly seated in the stick seat in the chain. To prevent breakage and damage to the machinery, by such misplaced stick, the front portion 51 of the movable part of the hopper may be pivoted, as at 52, and be provided with extension springs, 53. This portion 51 will then, when sufficient internal pressure is applied, move forward in the direction of chain movement, and permit the misplaced stick to move out of the hopper. After which the springs will draw the pivoted plate 51 back into its original position and the normal operation of the machine will continue.

During the insertion of the sticks into the molded candy it may be desirable to cover the cavities containing the candy with a retaining device. A retaining plate 54 is illustrated hinged to a standard 55 adjacent the path of movement of the chain between the pressing roll and the finishing roll. The plate will rest upon the top of the mold members as these are moved forward. It is frequently necessary to raise the plate 54 and to hold this in a raised position. To permit such raising and also to hold the plate to its work it is provided with a pair of arms 56 to each of which is pivoted a pin 57, which pin enters a rotatable guide member 58 mounted upon a standard 59. Between the guide member 58 and the arm 56 there is a compression spring 60. The construction is such that the pressure of the spring will be exerted to hold the retaining plate member down. When it is desired to raise the plate the handle 61 can be taken hold of, the plate swung on its pivot, which will bring the arm 56 down and in the position opposite to that occupied in Fig. 11 and the force of the spring 60 will then be exerted to hold plate 54 in a raised position.

To give the finished lolly pop the form demanded by the trade the sides of the mold cavity are caused to overhang, as at 62. This overhang would normally interfere with the removing of the lolly pop from the mold unless the mold were separable. The mold is illustrated herein as separable, and its two halves 63 and 64, see Fig. 12, each carried by a separate link, will as the sprocket chains 3 pass around the sprocket wheel 5 be moved apart, (see Fig. 1,) so that the molds are opened, upon the further movement of the chain the lolly pops will be discharged. The blocks which carry the pockets or mold spaces for the pieces of candy are mounted upon extensions 71 so that as the chain 3 passes over the sprocket wheel 5 the portion of the block which contains the mold will be at a greater radial distance from the center about which the chain is then curving than are the body portions of the links carrying such mold block, and this will not only cause an opening of the mold but will cause one-half to move away from the other half of the mold, thus assuring the escape of the molded candy. The candy could not escape with the mold shut owing to the undercutting of the mold above referred to. The lolly pops may drop from the molds upon an endless apron 65 mounted upon suitable rollers 66—67, one of which is driven by means of a gear wheel 68 which meshes with idler 69, which in turn meshes with gear 29 which is mounted upon shaft 21. The endless apron 65 will carry the finished article to some point for distribution, as for instance to a box 70.

At the working zone of the presser rolls 65 and the stick inserting mechanism the candy carrier will run over a support in the nature of a table 72, and at the working zone of the stick inserting mechanism an abutment 73 will be provided for resisting the thrust of the insertion of the sticks into the candy.

In Fig. 11 the pivot or rivet member 74 for the links of the chain 3 are illustrated, these being in such a position that the sprocket wheels 4 and 5 will engage between side members of the chain.

In Fig. 12 the molds are shown in closed position, that is a cavity 63 is shown in one end of one block and a complemental cavity 64 in the adjacent end of the next block. When the blocks are held in such a position that the complemental mold cavities are together they will form a mold, when the adjacent blocks are moved in such position one relative to the other that the die cavities move away one from the other the molds will open, as is seen at the right hand end of Fig. 1, at which position the candy will be discharged.

Having described my invention I claim:

1. In a machine of the character described the combination with a candy feed, of an endless chain having molds formed in the links, one half of a mold being in one link, and the other half of the same mold in the adjacent link, an endless stick carrying chain located in adjacent parallelism to the mold chain, the links of the stick carrying chain being provided with seats for sticks, stick pushers mounted on the stick carrying chain adjacent the several stick seats, means for forcing the candy into the molds, a roller over which the mold chain is bent, and stick pusher actuating means located at a position between the candy forcing means and said roller for pushing the sticks into the molded candy.

2. The combination with a series of lolly pop molds, of an endless chain carrying the molds, supporting and driving mechanism for the chain, an endless chain provided with stick seats, supporting and driving mechanism located in position and timed for advancing the chains with coincidence of speed and direction, a stick pusher for each seat having a guiding portion and a stick engaging portion for traversing the stick seat, a cam engaging member carried by the pusher, and a cam groove for said cam engaging member located at a position beyond the molding press and in the operative plane of the chains.

3. In a candy machine the combination with a series of blocks, each block having at each end a cavity located in position for forming a candy mold with a complemental cavity in the adjacent end of the next block, of a support for guiding the series of blocks for holding the said adjacent ends of the blocks together and the molds closed, a curved member for changing the direction of travel of the block for separating such ends and opening the molds, a molding press above the support, a candy feed adjacent to the press, means for inserting sticks in the molds in a direction transverse to the support, and an abutment at the working position of the stick inserting means for holding the blocks against the thrust of stick insertion.

MAX BUCHMÜLLER.

Witnesses:
  GUSTAVE M. GREENBAUM,
  ANDREW D. BALDWIN.